United States Patent [19]

Lenhardt

[11] Patent Number: 4,824,355
[45] Date of Patent: Apr. 25, 1989

[54] PREPARATION OF A PLASTIC FOR ITS EXTRUSION PARTICULARLY IN THE FORM OF A GAGED BEAD INTENDED TO BE USED AS A SEAL AND INTERLAYER IN MULTIPLE GLAZINGS

[75] Inventor: Karl Lenhardt, Neuhausen-Hamberg, Fed. Rep. of Germany

[73] Assignee: Saint-Gobain Vitrage, Courbevoie, France

[21] Appl. No.: 116,037

[22] Filed: Nov. 3, 1987

Related U.S. Application Data

[62] Division of Ser. No. 753,608, Jul. 10, 1985, Pat. No. 4,714,425.

[30] Foreign Application Priority Data

| Jul. 10, 1984 | [FR] | France | 84 10946 |
| Sep. 17, 1984 | [FR] | France | 84 14181 |
| Sep. 17, 1984 | [FR] | France | 84 14182 |
| Sep. 17, 1984 | [FR] | France | 84 14183 |
| Sep. 17, 1984 | [FR] | France | 84 14184 |

[51] Int. Cl.⁴ .............................................. B29C 47/86
[52] U.S. Cl. .............................. 425/378.1; 222/146.5; 425/381; 425/DIG. 13
[58] Field of Search ........... 425/376 R, 378 R, 192 R, 425/461–467, 406, 408, DIG. 23, DIG. 13; 222/146.2, 146.5; 219/214, 296, 421; 118/696, 410, 429; 156/109

[56] References Cited

U.S. PATENT DOCUMENTS

| 3,031,106 | 4/1962 | Hooker | 222/146.2 |
| 3,412,903 | 11/1968 | Van Riper, Jr. et al. | 222/146.5 |
| 3,456,849 | 7/1969 | Sjostrand | 222/146.1 X |
| 3,637,111 | 1/1972 | McCreary | 222/146.2 |
| 3,982,669 | 9/1976 | Moore | 222/146.5 |
| 4,024,854 | 5/1977 | Park et al. | 222/325 X |
| 4,073,409 | 2/1978 | Gardner et al. | 222/146.5 |
| 4,168,942 | 9/1979 | Firth | 222/146.2 X |
| 4,205,104 | 5/1980 | Chenel | 425/192 R X |
| 4,227,069 | 10/1980 | Gardner et al. | 222/146.5 X |
| 4,632,281 | 12/1986 | Wold | 222/146.2 X |

FOREIGN PATENT DOCUMENTS

| 0115479 | 8/1984 | European Pat. Off. |
| 2207799 | 6/1974 | France |
| 2206686 | 6/1974 | France |
| 2211413 | 7/1974 | France |
| 2544699 | 10/1984 | France |
| 2016960 | 10/1979 | United Kingdom |
| 2025190 | 1/1980 | United Kingdom |
| 2049815 | 12/1980 | United Kingdom |
| 1592799 | 7/1981 | United Kingdom |

Primary Examiner—Richard L. Chiesa
Attorney, Agent, or Firm—Oblon, Fisher, Spivak, McClelland & Maier

[57] ABSTRACT

The invention relates to the distribution of a plastic of the butyl rubber type, and more particularly to its preparation and its routing from a tank where it is hard, viscous and at a relatively low temperature, to an extrusion nozzle where it must have a viscosity and a hardness much lower than those that it had initially. The invention proposes a preparation in several stages combining heating and pressurizing so as to feed, at the desired delivery and with the desired quality of plastic, an optionally mobile nozzle. The invention applies to the production of a bead that is used as a seal and as an interlayer in multiple glazings.

8 Claims, 5 Drawing Sheets

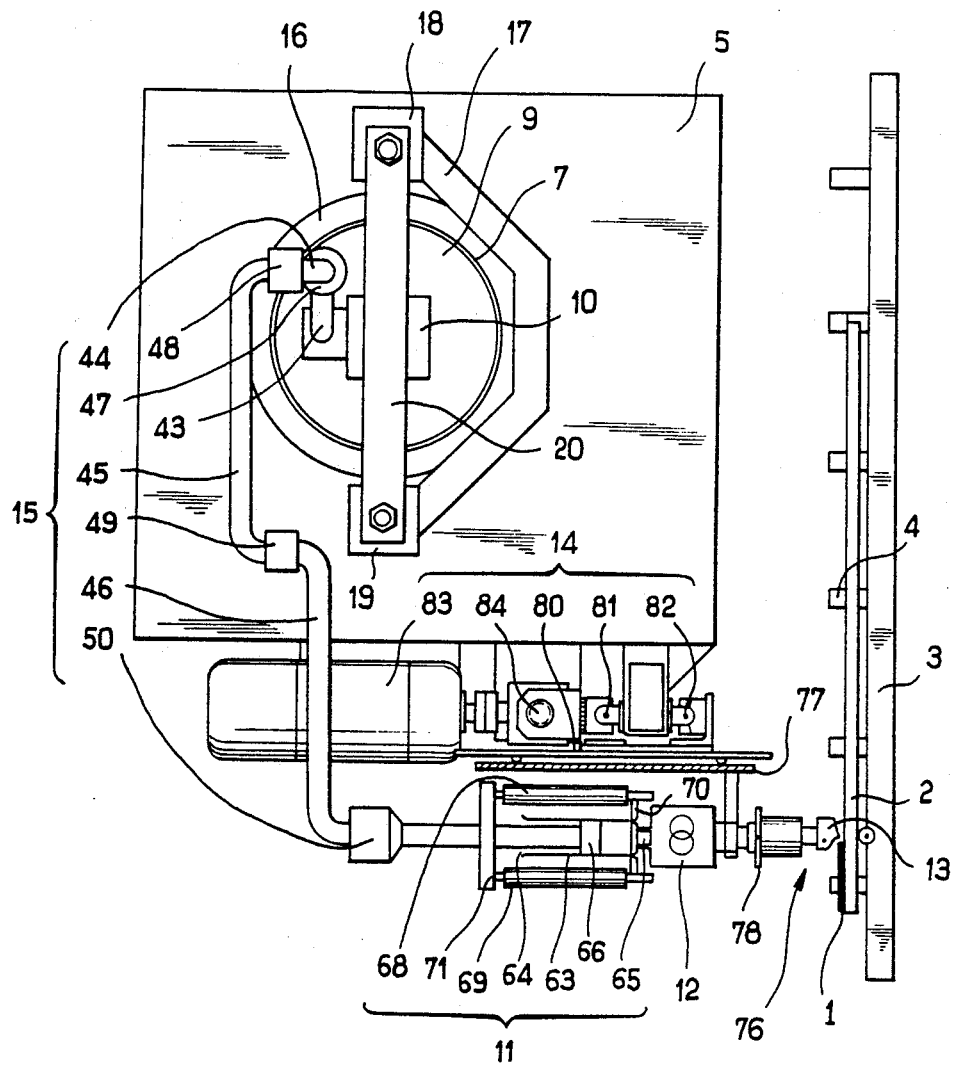
FIG_1A

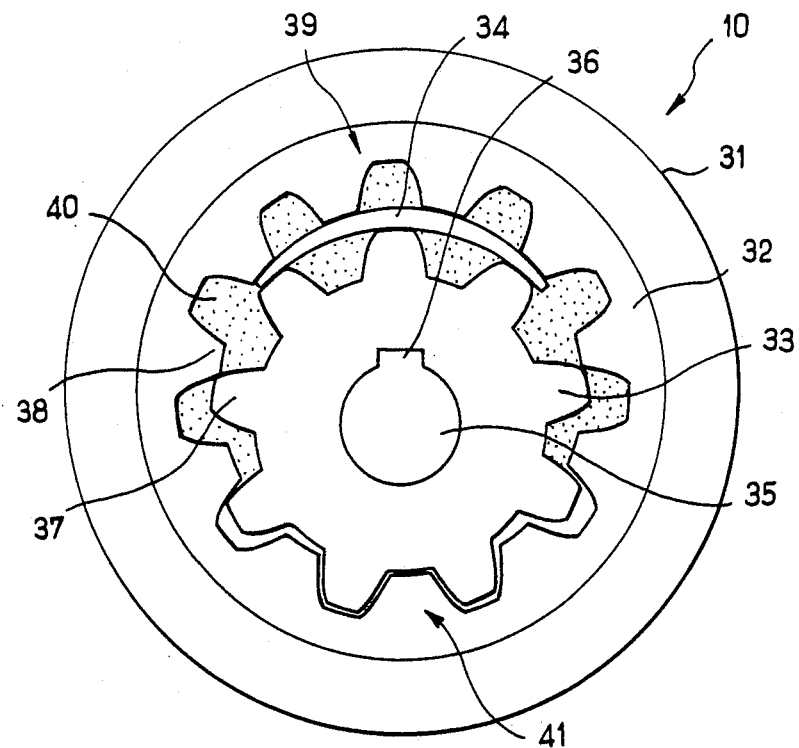
FIG_4
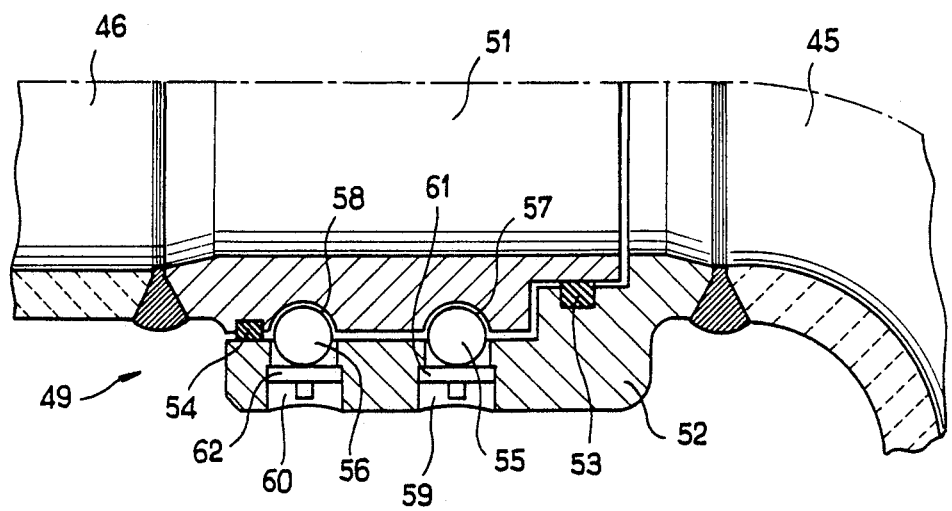
FIG_6

PREPARATION OF A PLASTIC FOR ITS EXTRUSION PARTICULARLY IN THE FORM OF A GAGED BEAD INTENDED TO BE USED AS A SEAL AND INTERLAYER IN MULTIPLE GLAZINGS

This is a division of application Ser. No. 06/753,608, filed July 10, 1985, and now U.S. Pat. No. 4,714,425.

BACKGROUND OF THE INVENTION

This invention relates to the distribution of a plastic of the butyl rubber type, particularly for the extrusion of the bead intended to serve as a seal and interlayer in multilayer glass sheets, hereinafter referred to as multiple glazings, and it relates more particularly to the preparation of said plastic and its routing from a tank where it is hard, viscous and at a relatively low temperature to an extrusion nozzle, optionally mobile in relation to the tank, where it should have a viscosity and hardness much lower than it had initially in the tank, and a higher temperature.

It is known from French Pat. No. 2 211 413 how to prepare a plastic of the butyl rubber type for the extrusion of a bead intended to be deposited on a glass sheet to make a multiple glazing, to work from small amounts of material, that can be easily and quickly heated, to obtain satisfactory characteristics of viscosity and hardness, on the one hand for the extrusion of the bead, on the other hand for the bonding of the bead thus extruded to a glass sheet. In addition, according to this prior patent, the extrusion unit is stationary and the glass sheets move to receive the extruded bead successively along all their edges.

This prior technique is satisfactory. However increase the rates of production on the one hand, and to increase the dimensions of the extruded beads on the other hand, it has been known to avoid working from small amounts of material, which would necessitate too-frequent stops for refeeding, but from large amounts of material, particularly directly from the drums of raw material delivered by the supplier.

These large amounts are more difficult to heat than small amounts, which restricts the deliveries and the rates while, on the contrary, it is desired to increase said deliveries and said rates.

To obtain at the output of the extrusion nozzle a suitable material, with the desired delivery, at the suitable temperature, different stages for preparing the material therefore have to be created, which necessitates circuits to feed these various stages.

Further, it has also been considered to use a technique for placing the bead on the glass sheets in which the nozzle supplying the bead would no longer be stationary, but would move, at least in one direction. Therefore, the circuits conducting raw material up to the nozzle necessarily have a relatively great length and cannot be stationary. To convey the material along these circuits, it is, on the one hand, as already stated, difficult to heat it sufficiently to lower its viscosity, on the other hand neither is it desirable to overheat it, so as not to degrade it. It is therefore necessary during the various stages for preparing the plastic to combine a moderate heating and a pressurizing.

It is known how to convey plastics in hoses, optionally cladded, but such material is, at certain times in its path, at pressures greater than 300 bars and at temperatures greater than 100° C. and the known hoses are incapable of resisting this temperature and this pressure at the same time.

SUMMARY OF THE INVENTION

This invention aims to avoid the drawbacks of the prior techniques, i.e., a stationary nozzle and frequent stops for refeeding due to the use of small amounts of basic material.

The invention contemplates making possible the distribution of a plastic at a high delivery and continuously when necessary, through at least one mobile nozzle, said plastic coming from a large-sized tank where it is available with a high viscosity and a high hardness, much higher than it must have at its output through the nozzle.

For this purpose, the invention proposes a process for preparing a plastic of the type having a butyl rubber base, from a mass of said material in the raw state, having in particular a high viscosity and a high hardness, for its extrusion through an output nozzle, particularly in the form of a gaged bead having a viscosity and a hardness lower than those of the material in the raw state. According to the invention a small volume of the material mass is heated, material from this volume is continuously removed by subjecting it to a pressure, this removed material is put under a higher pressure to propel it up to the output nozzle, this material is continuously introduced into a variable volume magazine that can expand when the amount of material that it receives is greater than the amount of material that it delivers and, on the other hand, that can shrink under the opposite conditions, necessary amounts of material are removed from this variable volume magazine, at the desired delivery, limited however by the volume of material stored in the variable volume magazine and by the continuous delivery which feeds said magazine.

The invention also proposes an installation for preparing a plastic of the butyl rubber type including: a tank of said material having a wall, particularly the cover, applied with pressure against the material, wall or this cover bored with an outlet orifice, having such a shape that the section of the volume of material that it encloses is smaller the closer it is to the output orifice, and being equipped on its face oriented toward the material with heating appendages which plunge into said material.

A pump is located at the output of the tank for supplying a continuous delivery of plastic under a high pressure while a variable volume magazine consists of a cylinder and a piston returned to the inside of the cylinder with a constant force less than the force exerted by the material supplying said magazine and an output nozzle is fixed to the variable volume magazine.

According to a particular embodiment, the cover of the tank has a conical shape.

According to the invention, the variable volume magazine and the output nozzle are able to move, said magazine and the pump then being connected by rigid conduits joined by rotating connections.

Advantageously, a positive-displacement pump is located at the output of the variable volume magazine upstream from the output nozzle.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 1A is a top view of the entire plastic distribution installation,

FIG. 4 is a detailed top view of an internal gear pump located at the output of the tank.

DETAILED DESCRIPTION OF THE PREFERRED EMBODIMENTS

Figure 1B:
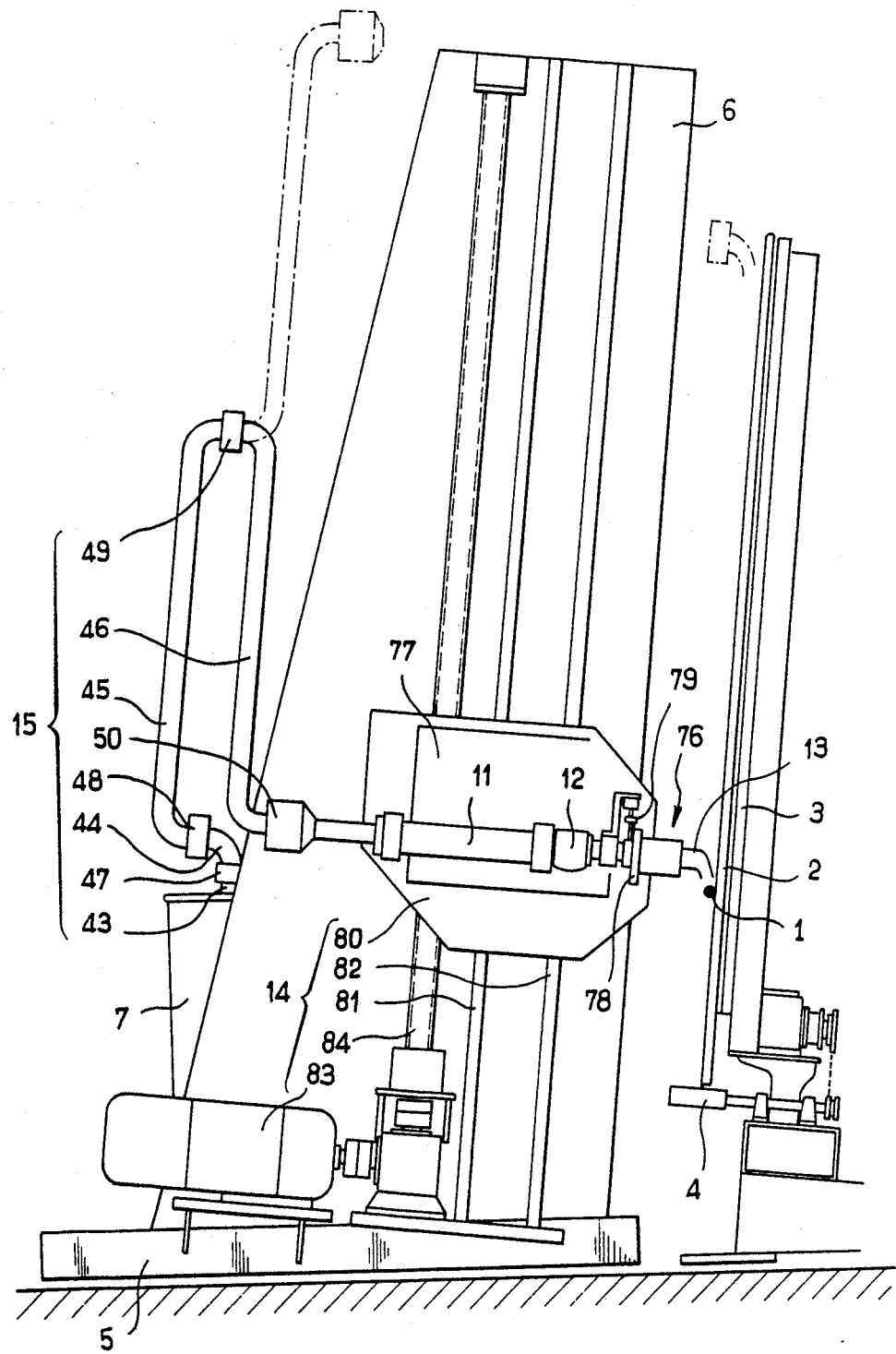
FIG. 1B is a profile view of the installation of FIG. 1A.

FIGS. 1A and 1B provide an overall view of the installation for preparing a plastic for supplying a bead intended to be used as a seal and an interlayer in a multiple glazing.

This bead 1 is intended to be deposited on a glass sheet 2, arranged vertically or approximately vertically against a wall 3, particularly with insertion of a gas cushion between said wall 3 and glass sheet 2, and resting on rollers 4 of a vertical conveyor.

The installation for preparing the plastic is mounted on a frame including a base 5 and a vertical panel 6 on which the various elements of the installation rest or are fastened.

This installation includes an open topped tank 7 of raw material 8 to be prepared and to be distributed in the form of bead 1, equipped with a heated cover 9, of a particular shape detailed below, a pump 10 at the output of this tank 7, a variable volume magazine 11, a positive-displacement pump 12, a nozzle 13 that can be oriented, means 14 of for translation of nozzle 13 and for magazine 11 in a direction different from that of the movement of glass sheets 2, and in this case in a vertical direction, at right angles to the direction of movement of glass sheets 2 and parallel to the plane of said glass sheets and of wall 3, and means 15 for transferring the raw material from pump 10 to variable volume magazine 11.

Figure 2:
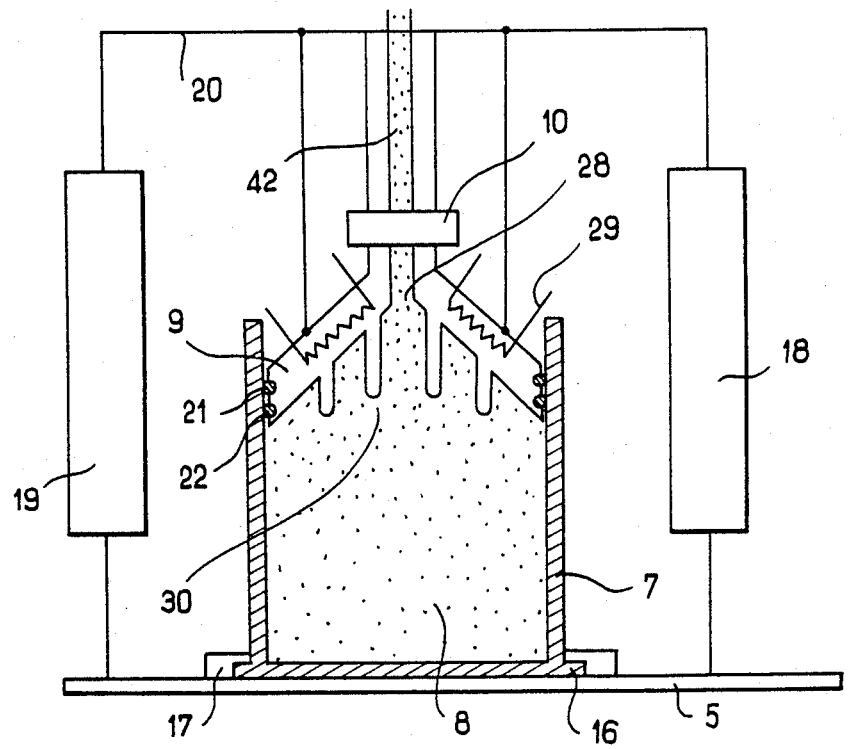
FIG. 2 is a more detailed view of the tank with a cone-shaped cover applied on the material.
Figure 3:
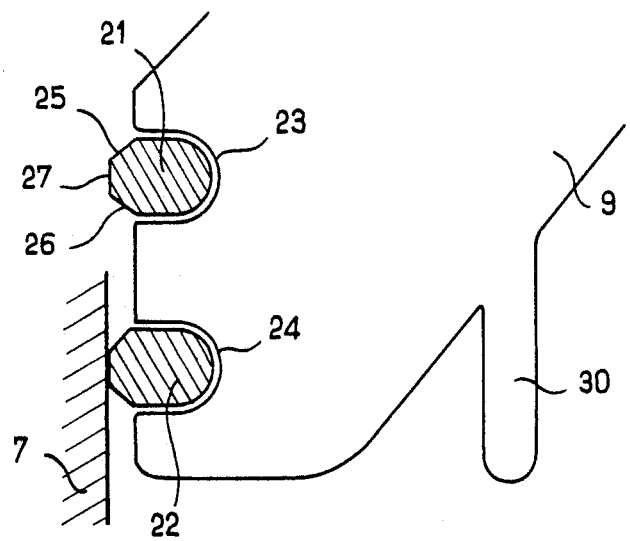
FIG. 3 is a view of the detail of a seal of the cover applied on the material.

Tank 7 has a broadened base 16 by which it is attached to base 5 thanks to a clamp 17. This tank 7 generally consists of the drum in which the plastic, for example having a butyl rubber base, is delivered by the supplier. As can be seen more particularly in FIG. 2, it is covered with a cover 9 able to plunge into it like a piston, under the pressure of two lateral jacks 18 and 19 (that also can be seen in FIG. 1A) acting on it by a gantry 20. This piston-forming cover 9 is equipped with at least two ring seals 21 and 22 that rub against the walls of the drum so as to achieve fluid-tightness despite the annular corrugations that are generally provided on the drums. These seals 21 and 22 have an outside diameter slightly greater than that of the inside of the drum; they are solid, bulky, hard (Shore hardness on the order of 70°), of a continuous rubber type material, and as shown in detail in FIG. 3, they are each fitted in a groove 23, 24 of cover 9.

Advantageously, to enable the centering of cover 9 on tank 7 and its progress inside said tank, both in the direction of plunging and in the opposite direction, each seal 21, 22 has a profile provided with two cants 25, 26 along an angle on the order of 20° with respect the direction parallel to the lateral wall of tank 7 against which they rest, separated by a flat piston for 27 whose surface is at least ⅓ of the total surface outside groove 23, 24 oriented toward the lateral wall of tank 7.

This piston-forming cover 9 has such a shape that it delimits a volume whose section is smaller the closer it is to an outlet 28 of the cover.

It can have the shape of a conical surface, in particular either a cone or a pyramid depending on whether tank 7 is cylindrical or prismatic, outlet 28 being located at the tip of the cone of the pyramid.

Generally, tanks 7 are cylindrical drums and cover 9 then has a concical shape and in particular a right circular cone.

The surface of this piston cover 9 is equipped with heating means such as electric resistors 29.

The face directed to the inside of tank 7 further provided with appendages 30, also heated.

These appendages 30 can be of variable lengths. Preferably, they are longer the closer they are to the outlet at the axis of the cone or of the pyramid that constitutes cover 9.

Advantageously, to facilitate the housing of piston cover 9 in tank 7, particularly when it arrives at the end of travel, these appendages 30 are contained inside the volume delimited by said piston cover 9.

To make it possible to use all of the material contained in the drum, the bottom of said drum opposite conical cover 9, equipped with heating appendages 30, can have a shape complementary to that of cover 9 with its appendages 30.

According to an advantageous variant, the bottom of drum 7 is flat, but it is provided with a nonadhering coating. This coating of the teflon, silicone, graphite, talc, etc. type, can be deposited directly on the bottom, or better on an intermediate bottom, for example of paper or cardboard.

Advantageously, this intermediate bottom, for example of siliconed paper, in is the shape of a crown, and in the place of the hollowed part of the center of the crown, the nonstick coating is deposited directly on the bottom of drum 7.

Outlet 28 through piston cover 9 of tank 7 feeds pump 10 directly.

Advantageously, considering the considerable viscosity and considerable hardness of the material having a butyl rubber base, even after the removal from tank 7, considering the continuity of required delivery and, of the size of the necessary delivery, a rotary internal gear pump 10 is involved.

Preferably, to avoid the drawbacks due to a resistance that is too great for functioning, in particular at the time of starting, this pump 10 is hydraulically actuated. This pump is represented diagrammatically in FIG. 1A and shown more in detail in top view in FIG. 4.

This rotary internal gear pump 10 has a pump body 31 enclosing a toothed circular crown 32 and, a rotor 33 also toothed, whose teeth have a shape complementary to the shape of those of crown 32. This rotor 33 is off-center in relation to crown 32 due to an off-centering core 34. This rotor 33 is bored in its center with a housing 35 with a keying groove 36 to receive a drive shaft and a locking key, not shown here, intended to drive rotor 33 in rotation.

Teeth 37 of rotor 33 and corresponding teeth 38 of crown 32 are distant from one another in zone 39 which surrounds off-centering core 34 thus forming large spaces 40 between them.

Going away from this zone 39, teeth 37 and 38 are increasingly better fitted into one another, which leads to a gradual restriction of spaces 40.

Spaces 40 are almost nonexistent and teeth 37 and 38 completely fitted into one another in zone 41 that is diametrically opposed to off-centering core 34.

Advantageously, as can be seen in FIG. 4, teeth 37 and 38 have a trapezoidal shape, which increases their mechanical strength and makes it possible to have larger spaces 40 than with another shape of teeth, particularly triangular.

Advantageously, to make a better supercharging of spaces 40 possible by the material removed from tank 7, the material is brought opposite said spaces 40, in region 39 where they are the largest, above from and below at the same time by a double pipe not shown in the figures, resulting from the division of a pipe 42 connected to outlet 28 through cover 9. A pump output pipe 43, that can be seen only in FIG. 1A is provided approximately perpendicular to zone 41 where spaces 40 are the smallest. This pipe 43 goes through pump body 31 in a direction approximately perpendicular to the plane of crown 32 and or rotor 33. Advantageously, the mouths of the supply pipes and of evacuation pipe 43 cover several spaces 40.

As can be seen in FIGS. 1A and 1B, the material coming from pump 10 is transmitted to the elements of the installation located downstream, by transfer means 15 consisting of multiplicity of rigid conduits 44, 45, 46 resistant to pressure and heat, connected to one another and to the upstream and downstream devices by rotating connections 47, 48, 49, 50 an example of which is shown in section in FIG. 6.

This rotating connection, for example 49 FIG. 6, comprises a male element 51 fitted into a female element 52, each of these two elements 51 and 52 being connected by welding to upstream conduit 45 and downstream conduit 46. The fluid-tightness between these two elements 51 and 52 is obtained through annular seals 53 and 54 and the rotation of the male part 51 in the female part 53 is facilitated by a series of balls 55 and 56 that roll in annular grooves 57 and 58 bored partially in male element 51, partially in female element 52.

Advantageously, to facilitate the rolling of balls 55 and 56 on the one hand and their exchange when they are worn out on the other hand, these balls are mounted elastically inside cavities 59, 60, on bearings 61, 62 that can be removed from the outside of female element 52.

These connections with a single axis of rotation are, with regard to fluid-tightness at high pressure, preferably to ball and socket revolving systems with multiple axes of rotation.

The movements in all the directions of the space are made possible by the justaposition of a multiplicity of these connections having a single degree of freedom, these connections being joined by bent rigid conduits.

Transfer means 15 described above are advantageously heated. They are intended to connect output pipe 43 of pump 10, which can progress in height since it is fixed to piston cover 9 which plunges into tank 7, to variable volume magazine 11 fixed to nozzle 13, which is capable of movements of translation in a vertical direction to be able to deposit a bead 1 over the entire height of glass sheet 2. To avoid blocking conduits 45 and 46 i aligned position when piston cover 9 is in the highest position and nozzle 13 is in lowest position or vice versa, said conduits 45 and 46 have a length such that there always exists between them an angle less than 180°.

Figure 5:
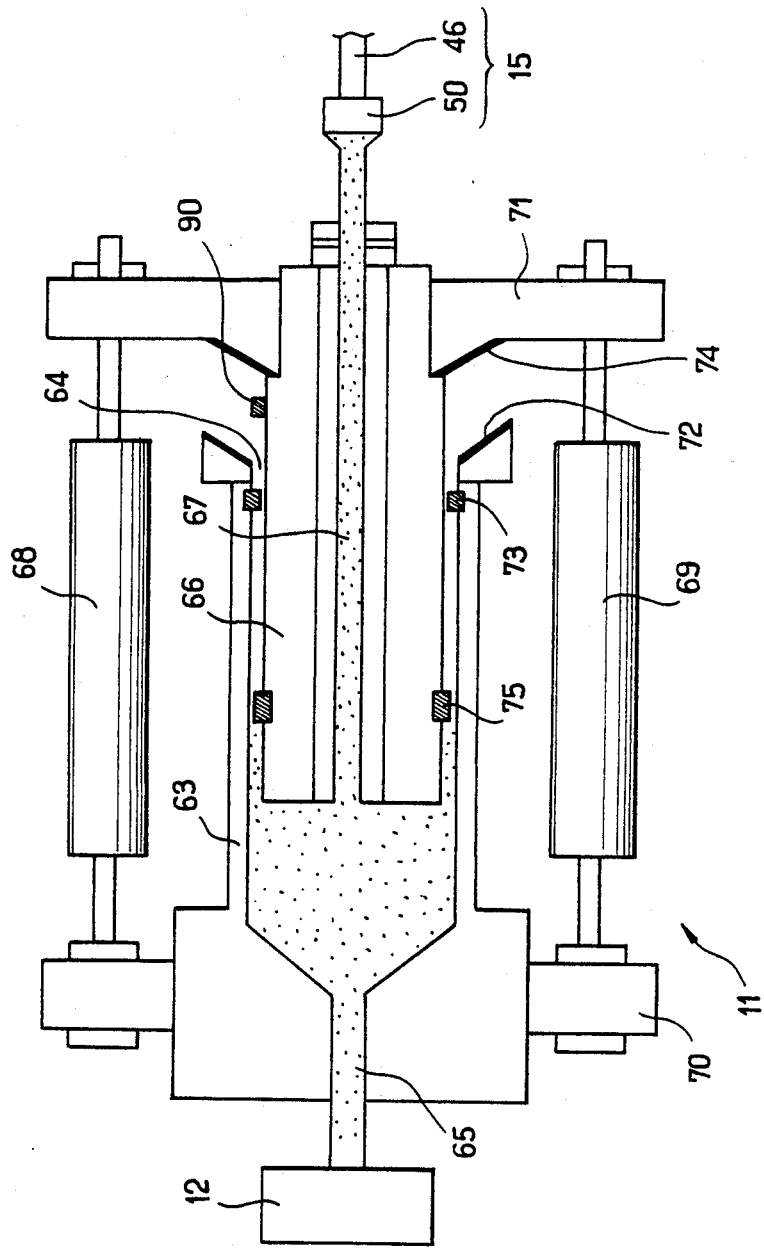
FIG. 5 is a detailed view of the variable volume magazine placed downstream from the pump according to FIG. 4 and, FIG. 6 is a section at the rotating connections that equip the transfer means connecting the pump of FIG. 4 to the magazine of FIG. 5.

The plastic material conveyed by transfer means 15 is introduced continuously at a steady delivery rates to the inside of variable volume magazine 11. This magazine 11 can be seen in top view in FIG. 1A, in side view in FIG. 1B and in more detailed view in FIG. 5. In comprises a cylinder 63 equipped with an input opening 64 and an output 65 feeding positive-displacement pump 12. Inside this cylinder 63 can move a piston 66 can move through whose entire length passes a plastic intake channel 67 which opens inside cylinder 63, this channel 67 being connected on the side of its upstream end to the last rotating connection 50 of transfer means 15.

Piston 66 is returned to the inside of cylinde 63 by a system exerting a constant force, particularly one or more jacks, and as in the example shown, two jacks 68 and 69 each connected on the one hand to cylinder 63 by a flange 70 and, on the other hand to piston 66 by a plate 71. The return force of jacks 68 and 69 is less than the force exerted by the plastic entering into magazine 11 to avoid any delivery counter to the normal direction of advance. The end of piston 66 plunged into cylinder 63 is equipped with annular scraping segments. End of travel stops 72, 73 of piston 66 inside cylinder 63, in each of the two possible directions of movement of said piston 66, also provided. These stops are engage contact elements 74, 75 belonging to piston 66 one element 74 determining the maximum penetration position, on the rear part of the piston, the other element 75 determining the maximum withdrawal position, therefore the maximum volume inside of cylinder 63, on the front end of the piston. An intermediate element 90 intended to come in contact with stop 72 is provided on the body of piston 66, this element determining the low level for refilling cylinder 63 and triggering the actuation of the upstream means for supplying plastic.

Contact between stops 72 and 73 and corresponding elements 74, 75 control stop the injection of plastic through output 65 and respectively stopping the supply of material to cylinder 63.

Advantageously, to avoid cooling of the plastic and optionally to complete its heating so that it reaches the desired consistency, the walls of cylinder 63 and of channel 67 are heated.

This variable volume magazine 11 delivers its plastic with a constant pressure to standard positive-displacement pump 12 whose speed of rotation can vary on demand.

At the output of pump 12, the plastic is supplied to an extrusion head 76 comprising nozzle 13. This extrusion head 76 is mounted on a carriage 77 pulled by means such as jacks and an endless screw activated by an electric motor, not shown, making is possible to move nozzle 13 close to or away from glass sheet 2. The electric motor and the endless screw make it possible to finely adjust the advance of carriage 77 carrying nozzle 13, particularly as a function of the thickness of the glass sheets 2, while the jacks make movements of a predetermined magnitude possible.

This extrusion head is mounted on a crown 78 that revolves around an axis perpendicular to the plane of vertical, or approximately vertical, wall 3 so as to correctly orient nozzle 13 with regard to the glass sheets as a function of the relative direction of movement of said nozzle and of said glass sheets. Actually, as taught in French Pat. No. 2,294,313 U.S. PAT. No. 4,205,104 the nozzle should make an angle between 15° and 45° and preferably between 25° and 35°, with the glass sheet.

To lock crown 78 in predetermined positions, a locking punch 79 engages in notches provided for this purpose in corwn 78 the, notches not shown in the figures.

The unit of variable volume magazine 11, positive-displacement pump 12, extrusion head 76, carriage 77 can move in translation in relation to glass sheets 2 under the action of means 14 detailed below. For this purpose, this unit is mounted on a plate 80 that can move along two slides 81, 82 parallel to wall 3 and therefore to the plane of glass sheets 2, in a direction different from that of the movement caused by the vertical roller conveyor 4 and in particular in a direction at right angles to the one imparted to glass sheets 2 by this roller conveyor 4. The movement along these two slides 81, 82 is caused by a motor 83 which drives in rotation an endless screw 84 parallel to slides 81 and 82, this endless screw 84 being engaged in ball sockets not shown, fixed to plate 80. Slides 81 and 82 and endless screw 84 are fastened along vertical panel 6.

As known in the art, nozzle 13 is also equipped with a system for adjusting the height of extruded bead 1, and with a bead cutter, not shown.

Also as is known in the art according to the French Pat. No. 2,207,799, a system known in the art able to create a partial vacuum in the circuit for supplying plastic has a bypass connection immediately upstream from nozzle 13. This system is also not shown in the figures.

The previously described installation operates in the following manner:

Plastic 8, for example, having a butyl rubber base, is provided in a drum 7. This drum is fastened on base 5 by clamp 17 which grips its base 16. Cone-shaped cover 9 is placed on this drum, then pressed against the material which is contained there by jacks 18 and 19. Under the action of this pressure and also the heating produced by heating appendages 30 and by the wall of this conical piston, the material covered by piston cover 9 is gradually softened and removed from drum 7 through output 28. The pressure under which the plastic is removed, however, is insufficient to convey it through the entire distribution circuit to output nozzle 13. However, this pressure is sufficient to supercharge pump 10, especially as the supercharging can be done on both faces of pump 10 by the two supply pipes. Because of this double supply, because of the particular shape of its teeth, this pump can deliver into its output pipe 43 a steady delivery of plastic under a pressure much higher than that upstream of said pump.

This pressure in the output pipe can be on the order of 300 of 350 bars. Thanks to this high pressure, it is not necessary to overhear the material to convey it up to nozzle 13, and therefore it is not likely to be degraded.

At the output of this pump 10, the plastic under high pressure, however at a temperature on the order of 100° C. is introduced into the conduits and the rotating connections of the transfer system 15. Thanks to this transfer system 15, generally of steel, the high pressures, and the relatively high temperature, can be supported without leaks.

The multiplicity of rigis conduits 44, 45, 56 and of rotating connections 47, 48, 49, 50, despite the single degree of freedom of each of said connections, makes it possible to transfer the plastic from pump 10, which descends strictly vertically into drum 7, to variable volume magazine 11 which also progresses, along slides 81, 82 in a slightly different direction, i.e., generally inclined about 5° in relation to the vertical. Thus, thanks to these possible movements, conduit 46 and rotating connection 50 can take the position indicated in broken lines in FIG. 1B, to feed nozzle 13 located toward the top of glass sheet 2 as shown in broken lines in this same figure.

Regardless of the relative positions of piston cover 9 and of nozzle 13 or of variable volume magazine 11, the routing of material 8 always takes place and under the same conditions.

Magazine 11 is therefore continuously fed with a delivery, sometimes however too small to extrude continuously certain very large beads 1, on the order of 15 mm and more, on large-sized glass sheets 2, that can have perimeters of close to 15 m. Thanks to magazine 11, an intermediate reserve of material can be constituted in particular by taking advantage of the stops for extrusion through nozzle 13, between two glass sheets 2 or further at the corners of said glass sheets. During these breaks, piston 66 moves out of cylinder 63 thus increasing the capacity of magazine 11.

On the other hand, during the extrusion of a bead of great height and in general of great section, if the continuous delivery provided by conical heating piston 9 and rotary internal gear pmp 10 is less than the delivery coming out through nozzle 13, the necessary additional delivery is obtained by gradually emptying the reserve in magazine 11. In this case, piston 66 advances, on the contrary, to the inside of cylinder 63. Thus, for example, when making a bead 1 of considerable height, 2.8 kg of material per minute is needed, thanks to the reserve accumulated in the variable volume magazine, it is possible to get by with a supply of material by conical heating piston 9 and gear pump 10, continuously, of 1.3 kg per minute. This variable volume magazine 11 also makes possible, by the action of lateral jacks 68 and 69 to control the pressure of the plastic, a control which is particularly important for the feeding of positive-displacement pump 12.

Positive-displacement pump 12 whose output delivery is regulated by acting on the motor which controls it, supplies the plastic at the desired delivery for the extrusion of a bead of determined section. Extrusion nozzle 13 is positioned directly opposite glass sheets 2, at a distance therefrom and oriented in the direction of the relative movement of nozzle 13 and of glass sheet 2. Once nozzle 13 is correctly oriented by rotatin of crown 78 which carries it, punch 79 locks said crown.

If bead 1 must be deposited along a ling parallel to the direction of movement provided by roller conveyor 4, nozzle 13 remains stationary, and extrudes the bead while the glass sheet passes before it.

If, on the other hand, bead 1 must be deposited along a long parallel to slides 81, 82, roller conveyor 4 remains at the stop and plate 80 moves steadily, under the action of motor 83 acting on endless screw 84 and on the ball sockets. The nozzle is thus driven with a steady movement of translation and it deposits bead 1 on immobile glass sheet 2.

By simultaneously guiding the movement of plate 80 and that of roller conveyor 4, a depositing of the bead along lines other than vertical and horizontal can also be obtained.

Therefore, thanks to this installation for preparing a plastic, there can be continuously obtained using several combined stages, at the output of an optionally mobile nozzle 13, a bead 1 of said plastic at a desired temperature, delivery, pressure, viscosity and hardness while at the beginning of the installation the material is at a much lower temperature, the viscosity and the hardness are much higher, whereas a single heating would be as much too long to soften the initial material according to the desired consistency and, moveover, would even be likely to degrade said material.

When the material contained in drum 7 is used up, conical cover 9 equipped with heating appendages 30 is withdrawn from drum 7. In the case of a drum bottom provided with a nonstick coating, a certain amount of plastic, that is tobe superposed on the material in the new drum, is withdrawn at the same time inside the conical cover, which makes it possible to restart the injection immediately and which avoids purging.

Obviously, numerous modificatons and variations of the present invention are possible in light of the above teachings. It is therefore to be understood that within the scope of the appended claims, the invention may be practiced otherwise than as specifically described herein.

I claim:

1. An installation for preparing a plastic material of the type having a butyl rubber base, comprising:
   a tank having an open top and containing raw plastic material;
   a cover inserted in said open top, said cover having an outlet orifice, a face of said cover oriented towards said plastic material having a shape such that a sectional area of a volume of the plastic material enclosed by said cover is smaller the closer said plastic material is to said outlet orifice;
   means for heating said cover;
   means for pressing said cover for movement into said tank, whereby the plastic material in said tank is heated and forced through said outlet; and
   a plurality of heating appendages formed on said face of said cover and extending toward said plastic material,
   wherein said appendages extend parallel to a direction of movement of said cover, and wherein the length of said appendages increases in inverse correspondence with the distance of said appendages from said outlet, whereby said heating appendages closest to said outlet provide increased heat transfer surface area to the plastic material as compared to ones of said heating appendages further from said outlet.

2. The installation of claim 1 wherein said face of said cover forms a cone.

3. The installation of claim 1 wherein said face of said cover is pyramidal.

4. The installation of claim 1 wherein said appendages are positioned entirely within a volume delimited by said cover.

5. The installation of claim 4 wherein the bottom of said tank has a shape complementary to that of said cover and said appendages.

6. The installation of claim 1 wherein said means for pressing comprise jacks extending between said cover and a base to which said tank is mounted.

7. The installation of claim 1 including a pump in said outlet.

8. The installation of claim 1 including sealing means between said cover and said tank.

* * * * *